US009895863B2

(12) United States Patent
Harako et al.

(10) Patent No.: US 9,895,863 B2
(45) Date of Patent: Feb. 20, 2018

(54) HIGH-STRENGTH GALVANIZED STEEL SHEET AND METHOD OF MANUFACTURING THE SAME

(71) Applicant: JFE Steel Corporation, Tokyo (JP)

(72) Inventors: Daisuke Harako, Tokyo (JP); Tetsuya Iwata, Tokyo (JP)

(73) Assignee: JFE Steel Corporation (JP)

( * ) Notice: Subject to any disclaimer, the term of this patent is extended or adjusted under 35 U.S.C. 154(b) by 0 days.

(21) Appl. No.: 14/914,803

(22) PCT Filed: Aug. 22, 2014

(86) PCT No.: PCT/JP2014/004338
§ 371 (c)(1),
(2) Date: Feb. 26, 2016

(87) PCT Pub. No.: WO2015/029404
PCT Pub. Date: Mar. 5, 2015

(65) Prior Publication Data
US 2016/0214351 A1 Jul. 28, 2016

(30) Foreign Application Priority Data

Aug. 26, 2013 (JP) .................................. 2013-174197

(51) Int. Cl.
*B32B 15/01* (2006.01)
*C23C 2/02* (2006.01)
*C23C 2/40* (2006.01)
*C22C 38/00* (2006.01)
*C22C 38/02* (2006.01)
*C22C 38/04* (2006.01)
*C22C 38/06* (2006.01)
*C21D 1/26* (2006.01)
*C21D 6/00* (2006.01)
*C21D 9/46* (2006.01)
*B32B 15/04* (2006.01)
*B32B 15/18* (2006.01)
*C21D 1/74* (2006.01)
*C23C 2/06* (2006.01)
*C22C 18/00* (2006.01)
*C22C 18/04* (2006.01)
*C21D 8/02* (2006.01)
*C21D 3/06* (2006.01)

(52) U.S. Cl.
CPC ............ *B32B 15/013* (2013.01); *B32B 15/01* (2013.01); *B32B 15/04* (2013.01); *B32B 15/18* (2013.01); *C21D 1/26* (2013.01); *C21D 1/74* (2013.01); *C21D 6/005* (2013.01); *C21D 6/008* (2013.01); *C21D 8/0278* (2013.01); *C21D 9/46* (2013.01); *C22C 18/00* (2013.01); *C22C 18/04* (2013.01); *C22C 38/00* (2013.01); *C22C 38/002* (2013.01); *C22C 38/02* (2013.01); *C22C 38/04* (2013.01); *C22C 38/06* (2013.01); *C23C 2/02* (2013.01); *C23C 2/06* (2013.01); *C23C 2/40* (2013.01); *C21D 3/06* (2013.01); *Y10T 428/12799* (2015.01); *Y10T 428/12972* (2015.01); *Y10T 428/12993* (2015.01)

(58) Field of Classification Search
CPC ......... C22C 38/04; C22C 18/00; C22C 18/04; C22C 38/00; C22C 38/06; C22C 38/02; C22C 38/002; B32B 15/013; B32B 15/01; B32B 15/04; B32B 15/18; Y10T 428/12799; Y10T 428/12972; Y10T 428/12993; C23C 2/02; C23C 2/06; C23C 2/40; C23C 30/00; C23C 30/005
See application file for complete search history.

(56) References Cited

U.S. PATENT DOCUMENTS 6,398,884 B1   6/2002  Kyono et al.

FOREIGN PATENT DOCUMENTS

| CA | 2 850 462     | 4/2013  |
| CN | 102791400     | 11/2012 |
| EP | 0 419 678 A1  | 4/1991  |
| EP | 2 415 896     | 2/2012  |
| EP | 2 546 008     | 1/2013  |
| JP | 54-130443 A   | 10/1979 |
| JP | 2-267251 A    | 11/1990 |
| JP | 04-6258       | 1/1992  |
| JP | 5-295483 A    | 11/1993 |
| JP | 8-294988      | 11/1996 |
| JP | 9-13156 A     | 1/1997  |
| JP | 9-118968 A    | 5/1997  |
| JP | 10-204597 A   | 8/1998  |
| JP | 2000-309824 A | 11/2000 |
| JP | 2006-37130 A  | 2/2006  |
| JP | 2007-039780   | 2/2007  |
| JP | 2008-261027 A | 10/2008 |
| JP | 2010-255111 A | 11/2010 |
| JP | 2010-255113 A | 11/2010 |
| JP | 2013-142198 A | 7/2013  |

OTHER PUBLICATIONS

Machine Translation, Abe et al., JP 2006-037130, Feb. 2006.*
Japanese Office Action dated Jun. 21, 2016 of corresponding Japanese Application No. 2015-533985, along with a Concise Statement of Relevance of Office Action in English.
Supplementary European Search Report dated Jul. 19, 2016, of corresponding European Application No. 14840002.1.
Korean Office Action dated Feb. 1, 2017, of corresponding Korean Application No. 2016-7007924, along with a Concise Statement of Relevance of Office Action in English.

(Continued)

*Primary Examiner* — Michael E. La Villa
(74) *Attorney, Agent, or Firm* — DLA Piper LLP (US)

(57) ABSTRACT

A high-strength galvanized steel sheet includes a base steel sheet having a specific chemical composition and a zinc coating layer disposed on the surface of the base steel sheet in a coating weight per side of 20 g/m² to 120 g/m², wherein the amount of hydrogen measured by a specific method is 0.05 mass ppm to 0.40 mass ppm; and $I_{Si}^{sur}/I_{Si}^{bulk}$ and $I_{Mn}^{sur}/I_{Mn}^{bulk}$ calculated by a specific method are not more than 2.0 and not more than 3.0, respectively.

2 Claims, No Drawings

(56) References Cited

OTHER PUBLICATIONS

Chinese Office Action dated Jan. 26, 2017, of corresponding Chinese Application No. 201480047552.6, along with an English translation.

Japanese Office Action dated Dec. 13, 2016, of corresponding Japanese Application No. 2015-533985, along with a Concise Statement of Relevance of Office Action in English.

Korean Office Action dated Sep. 6, 2017, of corresponding Korean Application No. 2016-7007924, along with a Concise Statement of Relevance of Office Action in English.

Chinese Office Action dated Dec. 5, 2017, of corresponding Chinese Application No. 201480047552.6, along with a Search Report in English.

* cited by examiner

HIGH-STRENGTH GALVANIZED STEEL SHEET AND METHOD OF MANUFACTURING THE SAME

TECHNICAL FIELD

This disclosure relates to a high-strength galvanized steel sheet suited as an anticorrosive steel sheet used in the fields of automobiles and the like, and to a method of manufacturing such a high-strength galvanized steel sheet.

BACKGROUND

Galvanized steel sheets having a zinc coating layer on the surface are inexpensive and highly anticorrosive steel sheets widely used in the fields of automobiles, home appliances, building materials and the like.

In addition to the enhancement in performance, the weight reduction is recently promoted in steel sheets used in the above fields, and this trend has led to a demand for steel sheets having higher strength. As a result, the use of high-strength and anticorrosive galvanized steel sheets has been on the rise.

In a general continuous galvanizing line, the galvanizing treatment is preceded by pretreatment steps in which the surface of a steel sheet is reduced and activated by annealing treatment in a $H_2$—$N_2$ reducing gas atmosphere and thereafter the steel sheet is cooled to a temperature suited for galvanizing while avoiding contact with air. Finally, the steel sheet is immersed in the galvanizing bath to produce a galvanized steel sheet.

To increase the strength of a steel sheet, solid solution strengthening elements such as silicon and manganese are added. When a high-strength steel sheet as a base steel sheet containing large amounts of these elements is subjected to annealing and galvanizing treatments, silicon and manganese that are prone to oxidation are concentrated on the surface of the steel sheet and form oxides in a reducing atmosphere generally used in annealing treatment. Such oxides decrease the wettability of the steel sheet surface with respect to the molten zinc in the subsequent galvanizing treatment, thereby causing bare-spot defects.

When the atmosphere during from annealing treatment until galvanizing treatment has a high $H_2$ concentration, hydrogen absorbed in the steel sheet during annealing treatment is liberated after the galvanizing treatment and accumulated between the base steel sheet and the zinc coating layer. The accumulated hydrogen is released out of the coating layer during alloying treatment of the galvanized steel sheet to produce a Zn—Fe alloyed galvanized steel sheet. Without the alloying treatment, the galvanized steel sheet suffers blistering defects in which the coating layer is raised by the pressure of the accumulated hydrogen.

To address the problems described above, Japanese Unexamined Patent Application Publication No. 2010-255111 discloses a method in which the oxygen potential is lowered by controlling the dew point of the furnace atmosphere during annealing treatment to not more than −45° C. and thereby galvanizing treatment is performed in the absence of silicon and manganese oxides. Further, Japanese Unexamined Patent Application Publication No. 2010-255113 discloses a method in which the hydrogen concentration in the furnace atmosphere during annealing treatment is controlled to not less than 25% to increase the ability of hydrogen to reduce the steel sheet, thus preventing the occurrence of bare-spot defects on the steel sheet.

To remedy blistering due to the absorption of hydrogen, for example, Japanese Unexamined Patent Application Publication No. 5-295483 discloses a method in which a small amount of titanium is added to the steel sheet to precipitate titanium compounds such as TiC and TiN, and hydrogen absorbed in the steel from the atmosphere is caused to remain trapped in voids formed around the precipitates, thereby suppressing the liberation of hydrogen after the galvanizing treatment.

While the method of Japanese Unexamined Patent Application Publication No. 2010-255111 may suppress bare-spot defects irrespective of the Si and Mn contents in steel, technical difficulties are encountered in maintaining the dew point in the annealing furnace at a low level, giving rise to a need of capital investments in new facilities. In the method of Japanese Unexamined Patent Application Publication No. 2010-255113, increasing the hydrogen concentration during annealing treatment causes the steel sheet to absorb an excessively large amount of hydrogen, resulting in the occurrence of blistering. Further, the method of Japanese Unexamined Patent Application Publication No. 5-295483 entails the limitation of steel composition to control blistering and the operation of continuous galvanizing line is adversely affected.

It could therefore be helpful to provide a high-strength galvanized steel sheet based on a Si- and Mn-containing steel sheet and having an excellent surface appearance without bare-spot defects or blistering, and provide a method of manufacturing such a steel sheet.

SUMMARY

We thus provide:

(1) A high-strength galvanized steel sheet, characterized by including;

a base steel sheet having a chemical composition, by mass %, C: 0.01% to 0.30%, Si: 0.01% to 1.5%, Mn: 0.1% to 3.0%, P: 0.003% to 0.1%, S: not more than 0.01%, Al: 0.001% to 0.20%, and the balance being Fe and inevitable impurities, and a zinc coating layer disposed on the surface of the base steel sheet in a coating weight per side of 20 g/m² to 120 g/m², wherein the amount of hydrogen measured by Method (1) is 0.05 mass ppm to 0.40 mass ppm, and $I_{Si}^{sur}/I_{Si}^{bulk}$ and $I_{Mn}^{sur}/I_{Mn}^{bulk}$ calculated by Method (2) is not more than 2.0 ($I_{Si}^{sur}/I_{Si}^{bulk} \leq 2.0$) and not more than 3.0 ($I_{Mn}^{sur}/I_{Mn}^{bulk} \leq 3.0$), respectively, (1)

after the zinc coating layer is removed from the high-strength galvanized steel sheet, the base steel sheet is heated from room temperature to 250° C. and the amount of hydrogen released from the base steel sheet during the heating is measured, (2)

after the zinc coating layer is removed from the high-strength galvanized steel sheet, the base steel sheet is analyzed by glow discharge spectrometry (GDS) to determine the maximum intensity of silicon ($I_{Si}^{sur}$) and the maximum intensity of manganese ($I_{Mn}^{sur}$) in the surface portion of the base steel sheet and the average intensity of silicon ($I_{Si}^{bulk}$) and the average intensity of manganese ($I_{Mn}^{bulk}$) inside the base steel sheet, and $I_{Si}^{sur}/I_{Si}^{bulk}$ and $I_{Mn}^{sur}/I_{Mn}^{bulk}$ are calculated.

(2) A method of manufacturing a high-strength galvanized steel sheet, characterized by including;

an annealing step of annealing a base steel sheet having the chemical composition described in (1) under conditions in which the hydrogen partial pressure ($P_{H2}$) is 0.10 to 0.50 relative to the total pressure in furnace atmosphere taken as 1 and the ratio $\log(P_{H2}/P_{H2O})$ is 2.5 to 4.0 wherein $P_{H2O}$ is the vapor partial pressure and $P_{H2}$ is the hydrogen partial pressure relative to the total pressure in furnace atmosphere taken as 1, a cooling holding step of cooling the annealed base steel sheet and holding the cooled base steel sheet under conditions in which the hydrogen partial pressure ($P_{H2}$) is 0.10 to 0.30 relative to the total pressure in atmosphere taken as 1, the steel sheet temperature is 400° C. to 600° C. and the holding time is 30 seconds or more, and a galvanizing step of galvanizing the base steel sheet in a galvanizing bath having an amount of Al of not less than 0.15%.

The high-strength galvanized steel sheet refers to a steel sheet having a tensile strength TS of not less than 400 MPa. The high-strength galvanized steel sheet includes a galvanized steel sheet without alloying treatment (hereinafter, also written as GI) and a galvanized steel sheet with alloying treatment (hereinafter, also written as GA).

A high-strength galvanized steel sheet may be obtained which is based on a Si and Mn containing base steel sheet and having an excellent surface appearance without bare-spot defects or blistering.

DETAILED DESCRIPTION

We discovered the following:

First, improving the wettability between the molten zinc and the base steel sheet surface requires that the ratio of Si concentrations and that of Mn concentrations between the surface portion of the base steel sheet and the inside portion of the base steel sheet be appropriately controlled so that silicon oxides and manganese oxides that are factors detrimental to wettability are prevented from forming on the surface portion of the base steel sheet.

Secondly, the remedy of blistering requires appropriate control of the amount of hydrogen accumulated inside the base steel sheet, in particular, the amount of hydrogen released when the steel sheet is heated to a temperature of 250° C.

The manufacturing of such a steel sheet entails controlling the atmosphere and the temperature during from the annealing step until the galvanizing step. Specifically, the annealing step should be performed such that the hydrogen partial pressure ($P_{H2}$) in the furnace atmosphere is 0.10 to 0.50 and the ratio of the hydrogen partial pressure ($P_{H2}$) to the vapor partial pressure ($P_{H2O}$) in the furnace atmosphere, $\log(P_{H2}/P_{H2O})$, is 2.5 to 4.0. These controls make it possible to decrease the oxygen potential without causing an excessive decrease in the dew point in the annealing furnace, thus suppressing the selective oxidation of silicon and manganese on the steel surface. In the holding step between the cooling step and the galvanizing step, it is necessary that the hydrogen partial pressure ($P_{H2}$) in the atmosphere be 0.10 to 0.30 and the holding time at a steel sheet temperature of 400° C. to 600° C. be at least 30 seconds. These controls ensure that the hydrogen accumulated inside the base steel sheet during the annealing step is released out of the base steel sheet and the steel sheet may be galvanized without the occurrence of blistering.

Hereinbelow, our steel sheets and methods will be described in detail without limiting the examples described below. In the following description, the unit of the content of each element in the chemical composition of steel is "mass %" and is written simply as "%" unless otherwise specified.

A high-strength galvanized steel sheet includes a base steel sheet and a zinc coating layer disposed on the surface of the base steel sheet.

The base steel sheet includes, by mass %, C: 0.01% to 0.30%, Si: 0.01% to 1.5%, Mn: 0.1% to 3.0%, P: 0.003% to 0.1%, S: not more than 0.01%, Al: 0.001% to 0.20%, and the balance being Fe and inevitable impurities.

C: 0.01% to 0.30%

Carbon is an element necessary to increase the strength of base steel sheet. The C content needs to be 0.01% or more to realize the increase in strength of base steel sheet. If, on the other hand, the C content exceeds 0.30%, weldability is deteriorated. Thus, the upper limit is 0.30%. The C content is preferably 0.06% to 0.12%.

Si: 0.01% to 1.5%

Silicon is a solid solution strengthening element. 0.01% or more silicon needs to be added to obtain the strengthening effect. On the other hand, adding more than 1.5% silicon results in a marked increase in the amount of silicon oxides formed on the surface of the base steel sheet during annealing treatment, thereby causing bare-spot defects. Thus, the upper limit is 1.5%.

Mn: 0.1% to 3.0%

Manganese is added to increase the strength. 0.1% or more manganese needs to be added to obtain the strengthening effect. On the other hand, adding more than 3.0% manganese results in a marked increase in the amount of manganese oxides formed on the surface of the base steel sheet during annealing treatment, thereby causing bare-spot defects. Thus, the upper limit is 3.0%. The Mn content is preferably 1.1% to 2.9%.

P: 0.003% to 0.1%

Phosphorus is one of the inevitable elements. Decreasing its content to below 0.003% gives rise to a concern that the cost is increased. Thus, the P content is limited to not less than 0.003%. If, on the other hand, the P content exceeds 0.1%, weldability is deteriorated. Thus, the P content is limited to not more than 0.1%. The P content is preferably not more than 0.015%.

S: not more than 0.01%

Sulfur causes a decrease in toughness by being segregated in grain boundaries or by forming a large amount of MnS. To avoid this, the S content needs to be 0.01% or less. The lower limit of the S content is not particularly limited and the content may be around an impurity level.

Al: 0.001% to 0.20%

Aluminum is added for the purpose of deoxidizing molten steel. This purpose is not fulfilled if the content is less than 0.001%. On the other hand, adding more than 0.20% aluminum results in formation of large amounts of inclusions and consequent defects in the base steel sheet. Thus, the Al content is limited to 0.001% to 0.20%.

The base steel sheet includes the aforementioned essential elements, iron and inevitable impurities. Examples of the inevitable impurities include oxygen and nitrogen.

The zinc coating layer is disposed on the surface of the base steel sheet. The coating weight per side may be a usual amount providing excellent properties such as corrosion resistance and adhesion of the zinc coating layer, and is 20 g/m² to 120 g/m².

Next, properties of the high-strength galvanized steel sheet will be described.

Amount of Hydrogen Released from the Base Steel Sheet

In the high-strength galvanized steel sheet, the amount of hydrogen released from the base steel sheet during heating from room temperature to 250° C. after removal of the zinc coating layer is 0.05 mass ppm to 0.40 mass ppm. The hydrogen stored in the base steel sheet is mainly hydrogen taken into the steel from the atmosphere during the annealing treatment. To ensure the effect of the hydrogen in suppressing the selective oxidation of the steel surface due to silicon and manganese, the lower limit of the amount of hydrogen absorbed in the steel is 0.05 mass ppm. If, on the other hand, the above amount of hydrogen exceeds 0.40 mass ppm, the amount of hydrogen accumulated in the steel is so large that blistering will be caused. Thus, the upper limit is 0.40 mass ppm. The amount of hydrogen is preferably 0.10 mass ppm to 0.38 mass ppm. The amount of hydrogen is measured as described in the Examples.

Ratio of Si Concentrations and that of Mn Concentrations Between the Surface Portion and the Inside Portion of the Base Steel Sheet After removal of the zinc coating layer from the high-strength galvanized steel sheet, the steel was analyzed by glow discharge spectrometry (GDS) in the depth direction from the surface. The analysis confirmed that the Si and Mn concentrations were high near the surface portion, the Si and Mn concentrations decreased with increasing depth and became constant. These concentrations should satisfy $I_{Si}^{sur}/I_{Si}^{bulk} \leq 2.0$ and $I_{Mn}^{sur}/I_{Mn}^{bulk} \leq 3.0$ wherein $I_{Si}^{sur}$ and $I_{Mn}^{sur}$ are the maximum intensities of silicon and manganese in the surface portion, and $I_{Si}^{bulk}$ and $I_{Mn}^{bulk}$ are the average intensities of silicon and manganese inside the base steel sheet where the Si and Mn concentrations are constant as defined above. Controlling these intensity ratios $I_{Si}^{sur}/I_{Si}^{bulk}$ and $I_{Mn}^{sur}/I_{Mn}^{bulk}$ to the above ranges ensures that the amounts of silicon oxides and manganese oxides formed in the surface portion of the base steel sheet during the annealing step are appropriate and the base steel sheet is allowed to exhibit good wettability with respect to the zinc coating layer and is prevented from bare-spot defects. The intensity ratios correspond to the concentration ratios. $I_{Si}^{sur}/I_{Si}^{bulk}$ is preferably 1.0 to 1.5, and $I_{Mn}^{sur}/I_{Mn}^{bulk}$ is preferably 1.1 to 2.6.

Next, the manufacturing method will be described.

The manufacturing method includes an annealing step of annealing the aforementioned base steel sheet, a cooling holding step of cooling the annealed base steel sheet and holding the cooled base steel sheet, and a galvanizing step of galvanizing the base steel sheet.

In the annealing step, the base steel sheet is annealed under conditions in which the hydrogen partial pressure ($P_{H2}$) is 0.10 to 0.50 relative to the total pressure in furnace atmosphere taken as 1 and the ratio $\log(P_{H2}/P_{H2O})$ is 2.5 to 4.0 wherein $P_{H2O}$ is the vapor partial pressure and $P_{H2}$ is the hydrogen partial pressure relative to the total pressure in furnace atmosphere taken as 1.

In the annealing atmosphere, both the increase in hydrogen partial pressure and the decrease in vapor partial pressure lower the oxygen potential in the atmosphere and are thus effective in suppressing selective oxidation of the steel surface due to silicon and manganese. The lower limit of the hydrogen partial pressure is 0.10 because the hydrogen partial pressure of less than 0.10 causes an insufficient reducing ability on the base steel sheet. On the other hand, the upper limit of the hydrogen partial pressure is 0.50 because the hydrogen partial pressure exceeding 0.50 causes heavy accumulation of hydrogen in the steel, resulting in blistering.

Further, if $\log(P_{H2}/P_{H2O})$ is less than 2.5, the oxygen potential in the atmosphere is not sufficiently low and selective oxidation of the steel surface due to silicon and manganese is not effectively suppressed. Therefore, the lower limit of $\log(P_{H2}/P_{H2O})$ is 2.5. On the other hand, the upper limit of $\log(P_{H2}/P_{H2O})$ exceeding 4.0 involves supplying an excessive amount of hydrogen to the atmosphere or lowering the dew point. Such approaches are accompanied by blistering and unstable operation. Therefore, the upper limit of $\log(P_{H2}/P_{H2O})$ is 4.0.

In the cooling holding step, the annealed base steel sheet is cooled and the cooled base steel sheet is held under conditions in which the hydrogen partial pressure ($P_{H2}$) is 0.10 to 0.30 relative to the total pressure in atmosphere taken as 1, the steel sheet temperature is 400° C. to 600° C. and the holding time is 30 seconds or more.

In the cooling holding step, the cooled base steel sheet is held until the galvanizing step under conditions in which the hydrogen partial pressure ($P_{H2}$) is 0.10 to 0.30 relative to the total pressure in atmosphere taken as 1, the steel sheet temperature is 400° C. to 600° C. and the holding time is 30 seconds or more.

At a steel sheet temperature of 600° C. or less, the amount of hydrogen released from the base steel sheet to the atmosphere surpasses the amount of hydrogen absorbed into the base steel sheet from atmosphere. Thus, the hydrogen accumulated in the steel during the annealing step is released during the holding in this temperature range for at least 30 seconds and, consequently, blistering is prevented. The upper limit of the holding time is not particularly limited. The holding time is preferably 32 seconds to 50 seconds. The lower limit of the steel temperature is 400° C. If the steel sheet temperature falls below 400° C., immersion of the base steel sheet into the galvanizing bath takes place while the sheet temperature is lower than the solidifying point of zinc. Thus, the galvanizing treatment encounters difficulties in controlling the coating weight. From the point of view of suppressing selective oxidation of the steel surface due to silicon and manganese, the lower limit of the hydrogen partial pressure during the holding is 0.10 relative to the total pressure in atmosphere taken as 1. The upper limit is 0.30 to ensure a small amount of hydrogen absorbed into the base steel sheet from atmosphere. The hydrogen partial pressure is preferably 0.13 to 0.30.

In the galvanizing step, the base steel sheet after the cooling holding step is galvanized. The galvanizing bath used in this step may be a conventional bath, for example, a galvanizing bath containing a small amount of aluminum. A small amount of aluminum suppresses formation of Fe—Zn alloy layer at the interface between the zinc coating layer and the steel (the base steel sheet) and effectively increases adhesion of the zinc coating layer. A galvanizing bath having an amount of aluminum of not less than 0.15% is preferably used.

In this step, the coating weight of the zinc coating layer may be adjusted to a desired range by a method such as gas wiping.

EXAMPLES

Slabs having chemical compositions described in Table 1 were heated at 1250° C., hot rolled to a thickness of 3.0 mm, and coiled at 550° C. to produce hot-rolled steel sheets. Thereafter, scales on the hot-rolled steel sheets were removed by pickling and the hot-rolled steel sheets were cold rolled to a thickness of 1.4 mm.

Using a continuous galvanizing line CGL, the cold-rolled steel sheets were continuously annealed under conditions described in Table 2, and thereafter galvanized by being immersed into an Al-containing Zn bath. The coating weight was adjusted to 70 g/m² per side by gas wiping.

TABLE 1

| Steel No. | Chemical composition (mass %) | | | | | | Remarks |
|---|---|---|---|---|---|---|---|
| | C | Si | Mn | P | S | Al | |
| A | 0.06 | 0.01 | 1.4 | 0.008 | 0.003 | 0.02 | Ex. |
| B | 0.07 | 0.01 | 2.1 | 0.009 | 0.006 | 0.01 | Ex. |
| C | 0.10 | 0.01 | 2.4 | 0.010 | 0.005 | 0.01 | Ex. |
| D | 0.12 | 0.01 | 2.9 | 0.009 | 0.007 | 0.01 | Ex. |
| E | 0.06 | 0.10 | 1.1 | 0.011 | 0.005 | 0.02 | Ex. |
| F | 0.08 | 0.25 | 1.4 | 0.010 | 0.006 | 0.01 | Ex. |
| G | 0.10 | 0.70 | 1.9 | 0.013 | 0.008 | 0.01 | Ex. |
| H | 0.12 | 1.1 | 2.3 | 0.009 | 0.006 | 0.01 | Ex. |
| I | 0.12 | 1.5 | 2.6 | 0.015 | 0.007 | 0.01 | Ex. |
| J | 0.15 | 1.6 | 2.6 | 0.012 | 0.006 | 0.02 | Comp. Ex. |

The galvanized steel sheets (GI) obtained above were subjected to the following evaluations.

Evaluation of Bare Spots

The surface appearance of the galvanized steel sheet was visually inspected for bare spots. The bare spot was evaluated as excellent (⊚) when bare spots were completely absent, as good (○) when slight bare spots were present but did not deteriorate the surface quality, and as poor (×) when bare spots were present and the surface quality was deteriorated. Those rated as "⊚" and "○" were acceptable.

Evaluation of Blistering

A 300 mm×300 mm sample cut from the galvanized steel sheet was heat treated in a hot air baking furnace. The heat treatment conditions were such that after the steel sheet temperature reached 250° C., the sample was held at the temperature for 30 minutes, air cooled to room temperature and visually inspected for blistering. The blistering was evaluated as good (○) when blistering was completely absent, and as poor (×) when blistering was present. Those rated as "○" were acceptable.

Evaluation of Amount of Hydrogen Stored in Steel

A 5 mm×100 mm sample cut from the galvanized steel sheet was immersed in liquid nitrogen and cooled at approximately −196° C. to give a test piece for the quantitative determination of amount of hydrogen in steel. While keeping the test piece at −100° C. or below, the zinc coating layer on the steel surface was removed by grinding. After the steel surface was cleaned with alcohol, the test piece was set on a gas chromatograph and the amount of hydrogen was determined. The measurement conditions were such that the temperature was raised to 250° C. at a heating rate of 200° C./hr and the test piece was held at 250° C. for 30 minutes. The amount of hydrogen released from the heating step to the holding step was measured. Three test pieces for each sheet were tested, and the results were averaged.

Evaluation of Surface to Bulk Concentration Ratios in Base Steel Sheet

A 30 mm×30 mm sample cut from the galvanized steel sheet was immersed in a mixture liquid of 195 cc of an aqueous 20 mass % NaOH-10 mass % triethanolamine solution and 7 cc of a 35 mass % hydrogen peroxide solution, and the coating layer was dissolved, thereby preparing a test piece. The test piece was set on GDS and sputtered at an Ar gas flow rate of 250 cc and a current of 20 mA for 500 seconds. The average intensity from 450 seconds to 500 seconds of sputtering time was defined as the intensity inside the base steel sheet. Based on the intensity profiles of silicon and manganese, the ratio of the maximum intensity to the average intensity inside the base steel sheet was obtained for silicon and manganese. Three test pieces for each sheet were tested, and the results were averaged.

The results obtained and the manufacturing conditions are described in Table 2.

From Table 2, the surface appearance was good in all of the Examples. In contrast, the Comparative Examples falling outside our scope were evaluated as poor in any of "Evaluation of bare spots" and "Evaluation of blistering".

TABLE 2

| Test No. | Steel No. | Manufacturing conditions | | | | Steel sheet properties | | | | | |
|---|---|---|---|---|---|---|---|---|---|---|---|
| | | Annealing step | | Cooling holding step | | Amount of hydrogen in steel | | | Evaluations | | |
| | | $P_{H2}$ | $\log(P_{H2}/P_{H2O})$ | $P_{H2}$ | Holding time at steel sheet temperatures of 400 to 600° C. (sec) | (mass ppm) | $I_{Si}^{sur}/I_{Si}^{bulk}$ | $I_{Mn}^{sur}/I_{Mn}^{bulk}$ | Bare spots | Blistering | Remarks |
| 1 | A | 0.20 | 3.7 | 0.20 | 45 | 0.18 | 1.0 | 1.3 | ⊚ | ○ | Ex. |
| 2 | B | 0.10 | 2.7 | 0.14 | 45 | 0.11 | 1.0 | 2.6 | ○ | ○ | Ex. |
| 3 | B | 0.15 | 2.9 | 0.17 | 45 | 0.13 | 1.0 | 1.9 | ⊚ | ○ | Ex. |
| 4 | B | 0.22 | 3.1 | 0.15 | 45 | 0.17 | 1.0 | 1.4 | ⊚ | ○ | Ex. |
| 5 | B | 0.35 | 3.3 | 0.20 | 45 | 0.30 | 1.0 | 1.3 | ⊚ | ○ | Ex. |
| 6 | B | 0.48 | 3.6 | 0.25 | 45 | 0.38 | 1.0 | 1.1 | ⊚ | ○ | Ex. |
| 7 | B | 0.52 | 3.6 | 0.25 | 45 | 0.42 | 1.0 | 1.1 | ⊚ | X | Comp. Ex. |
| 8 | B | 0.15 | 2.4 | 0.12 | 45 | 0.10 | 1.0 | 3.5 | X | ○ | Comp. Ex. |
| 9 | B | 0.12 | 2.7 | 0.13 | 45 | 0.13 | 1.0 | 1.9 | ⊚ | ○ | Ex. |
| 10 | B | 0.15 | 3.4 | 0.16 | 45 | 0.27 | 1.0 | 1.3 | ⊚ | ○ | Ex. |
| 11 | B | 0.20 | 3.2 | 0.28 | 45 | 0.35 | 1.0 | 1.5 | ⊚ | ○ | Ex. |
| 12 | B | 0.25 | 3.0 | 0.31 | 45 | 0.41 | 1.0 | 1.3 | ⊚ | X | Comp. Ex. |
| 13 | B | 0.19 | 2.8 | 0.22 | 32 | 0.37 | 1.0 | 1.4 | ⊚ | ○ | Ex. |
| 14 | B | 0.20 | 2.7 | 0.24 | 24 | 0.44 | 1.0 | 1.5 | ⊚ | X | Comp. Ex. |
| 15 | C | 0.19 | 3.2 | 0.20 | 45 | 0.20 | 1.0 | 2.0 | ⊚ | ○ | Ex. |
| 16 | D | 0.30 | 3.5 | 0.25 | 45 | 0.34 | 1.0 | 2.4 | ⊚ | ○ | Ex. |
| 17 | E | 0.15 | 3.0 | 0.19 | 50 | 0.19 | 1.2 | 1.6 | ⊚ | ○ | Ex. |
| 18 | F | 0.20 | 3.3 | 0.19 | 50 | 0.23 | 1.2 | 1.7 | ⊚ | ○ | Ex. |
| 19 | G | 0.25 | 3.4 | 0.25 | 50 | 0.29 | 1.4 | 1.9 | ⊚ | ○ | Ex. |
| 20 | H | 0.25 | 3.4 | 0.25 | 50 | 0.30 | 1.5 | 1.8 | ⊚ | ○ | Ex. |

TABLE 2-continued

| | | Manufacturing conditions | | | | Steel sheet properties | | | Evaluations | | |
|---|---|---|---|---|---|---|---|---|---|---|---|
| | | Annealing step | | Cooling holding step | | Amount of hydrogen in steel | | | | | |
| Test No. | Steel No. | $P_{H2}$ | $\log(P_{H2}/P_{H2O})$ | $P_{H2}$ | Holding time at steel sheet temperatures of 400 to 600° C. (sec) | (mass ppm) | $I_{Si}^{sur}/I_{Si}^{bulk}$ | $I_{Mn}^{sur}/I_{Mn}^{bulk}$ | Bare spots | Blistering | Remarks |
| 21 | I | 0.25 | 3.6 | 0.30 | 50 | 0.34 | 1.5 | 2.0 | ⊙ | ○ | Ex. |
| 22 | J | 0.30 | 3.7 | 0.30 | 50 | 0.39 | 2.4 | 2.2 | X | ○ | Comp. Ex. |

The invention claimed is:

1. A high-strength galvanized steel sheet comprising:

a base steel sheet having a chemical composition, by mass %, C.:0.06% to 0.30%, Si: 0.01% to 1.5%, Mn: 0.1% to 3.0%, P: 0.003% to 0.1%, S: not more than 0.01%, Al: 0.001% to 0.20%, and the balance being Fe and inevitable impurities, and a zinc coating layer disposed on a surface of the base steel sheet at a coating weight per side of 20 g/m² to 120 g/m², wherein an amount of hydrogen atoms measured by Method (1) in the base steel sheet is 0.05 mass parts per million to 0.40 mass parts per million, and $I_{Si}^{sur}/I_{Si}^{bulk}$ and $I_{Mn}^{sur}/I_{Mn}^{bulk}$ as calculated by Method (2) is not more than 2.0 ($I_{Si}^{sur}/I_{Si}^{bulk} \leq 2.0$) and not more than 3.0 ($I_{Mn}^{sur}/I_{Mn}^{bulk} \leq 3.0$), respectively, and such that Method (1) requires cooling a section of the high-strength galvanized steel sheet in liquid nitrogen, removing the zinc coating layer from the high-strength galvanized steel sheet, then heating the base steel sheet from room temperature to 250° C. at a heating rate of 200° C./hr and holding at 250° C. for 30 minutes, and measuring the amount of hydrogen released from the base steel sheet during the heating, such that Method (2) requires that, after the zinc coating layer is removed from the high-strength galvanized steel sheet, the base steel sheet is analyzed by glow discharge spectrometry (GDS) and sputtered at an Ar gas flow rate of 250 cc and a current of 20 mA for 500 seconds to determine the maximum intensity of silicon ($I_{Si}^{sur}$) and the maximum intensity of manganese ($I_{Mn}^{sur}$) in the surface portion of the base steel sheet and the average intensity of silicon ($I_{Si}^{bulk}$) and the average intensity of manganese ($I_{Mn}^{bulk}$) inside the base steel sheet, wherein the surface portion extends to a depth where the Si and Mn concentrations are constant, and $I_{Si}^{sur}/I_{Si}^{bulk}$ and $I_{Mn}^{sur}/I_{Mn}^{bulk}$ are calculated.

2. A method of manufacturing a high-strength galvanized steel sheet according to claim 1 comprising:

annealing a base steel sheet having the chemical composition described in claim 1 under conditions in which hydrogen partial pressure ($P_{H2}$) is 0.10 to 0.50 relative to a total pressure in a furnace atmosphere taken as 1 and a ratio $\log(P_{H2}/P_{H2O})$ is 2.5 to 4.0 wherein $P_{H2O}$ is vapor partial pressure and $P_{H2}$ is hydrogen partial pressure relative to the total pressure in the furnace atmosphere taken as 1, cooling the annealed base steel sheet and holding the cooled base steel sheet under conditions in which the hydrogen partial pressure ($P_{H2}$) is 0.10 to 0.30 relative to the total pressure in atmosphere taken as 1, the steel sheet temperature is 400° C. to 600° C. and the holding time is 30 seconds or more, and galvanizing the base steel sheet in a galvanizing bath having an amount of Al of not less than 0.15%.

* * * * *

UNITED STATES PATENT AND TRADEMARK OFFICE
CERTIFICATE OF CORRECTION

PATENT NO. : 9,895,863 B2
APPLICATION NO. : 14/914803
DATED : February 20, 2018
INVENTOR(S) : Harako et al.

Page 1 of 1

It is certified that error appears in the above-identified patent and that said Letters Patent is hereby corrected as shown below:

In the Claims

In Column 20,
At Line 29, please change "$^{bulk} \leq 3.0$" to -- $^{bulk} \leq 3.0$ --.

Signed and Sealed this
Seventeenth Day of July, 2018

Andrei Iancu
*Director of the United States Patent and Trademark Office*